(12) United States Patent
Slutz et al.

(10) Patent No.: US 6,601,119 B1
(45) Date of Patent: Jul. 29, 2003

(54) METHOD AND APPARATUS FOR VARYING TARGET BEHAVIOR IN A SCSI ENVIRONMENT

(75) Inventors: Mark A. Slutz, Colorado Springs, CO (US); Erik Paulsen, Colorado Springs, CO (US); Carl E. Gygi, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/012,616

(22) Filed: Dec. 12, 2001

(51) Int. Cl.[7] .......................... G06F 13/00; G06F 13/10
(52) U.S. Cl. ........................ 710/104; 710/8; 713/100
(58) Field of Search .............................. 710/104, 8, 315, 710/10, 305, 11, 36, 6; 709/301, 326; 713/100

(56) References Cited

U.S. PATENT DOCUMENTS

| | | | | |
|---|---|---|---|---|
| 5,809,291 A | * | 9/1998 | Munoz-Bustamante et al. | |
| 5,919,253 A | * | 7/1999 | Schneider | |
| 6,061,753 A | * | 5/2000 | Ericson | |
| 6,145,019 A | * | 11/2000 | Firooz et al. | |
| 6,477,165 B1 | * | 11/2002 | Kosco | |
| 6,477,587 B1 | * | 11/2002 | Isoda et al. | |

* cited by examiner

*Primary Examiner*—Gopal C. Ray
(74) *Attorney, Agent, or Firm*—Maginot, Moore & Bowman LLP

(57) ABSTRACT

A communications layer is provided between a host-based SCSI initiator and a SCSI target device to fully automate the validation process. The communications layer allows the host to direct variation and modification of the target parameters and behavior using vendor unique commands. The behavioral modification aims to establish interoperability by conforming the behavior of the target to the host behavior. The host-based initiator transports a suitable command structure to the target device containing appropriate ones of the vendor unique commands and associated parameter data. The target executes and otherwise processes the command structure to effectuate a reconfiguration according to the specifics of the command code. The command code is sufficient to fully reconfigure the SCSI target. Accordingly, the reconfiguration process is carried out in a fully automated fashion.

20 Claims, 3 Drawing Sheets

METHOD AND APPARATUS FOR VARYING TARGET BEHAVIOR IN A SCSI ENVIRONMENT

BACKGROUND OF THE INVENTION

1. Field of the Invention

The present invention relates to a validation process involving a SCSI host and a SCSI target within computer environments, and, more particularly, to the use of computer-related processes resident at the host computer environment to modify the parameters and behavior of target devices in a SCSI environment.

2. Description of the Related Art

The capabilities of host computer environments have expanded significantly with the increased development of peripheral devices for attachment to the host computer. A variety of peripheral components are now available for use by the end user applications. For example, the peripheral environment may include external devices such as disk arrays, tapes, CD-ROMs, printers, network controllers, optical scanners, and various other apparatus that provide a wide range of functionality.

The external peripheral environment is typically connected to the host computer environment using a suitable bus architecture. The Small Computer System Interface (SCSI) technology is one example of such a bus topology. In a typical arrangement, the host computer is configured with a host adapter provided in the form of a SCSI controller to provide the proper interfacing between the host bus (such as PCI) and the SCSI environment. The host computer will also include suitable SCSI device drivers for the installed SCSI peripheral devices.

The SCSI communications protocol employs a transaction process between a SCSI device configured as an initiator and a SCSI device configured as a target. Any SCSI device can be equipped with both functionalities. The SCSI initiator originates a request for an action or task to be performed, while a SCSI target receives and performs the requested task as expressed in a suitable command structure. For this purpose, SCSI targets typically include an intelligent controller that enables it to perform the initiator-developed commands in a manner relatively independently of the initiator. A SCSI bus is used to transport data, command, and control information between the initiator and target.

One advantage of SCSI implementations is that the host CPU need not expend valuable processing cycles in monitoring and managing operations involving the SCSI target devices. For example, in a typical I/O request such as a read/write operation, a high-level user program simply generates the I/O request at the application layer. The operating system (OS) then forwards the request to the suitable host-based SCSI disk driver. This hand-off from the OS to the appropriate SCSI driver entry point typically represents the extent of the participation of the CPU in terms of fulfilling the request. The SCSI environment itself is configured to complete the operation without further intervention or assistance from the CPU.

For example, the SCSI disk driver translates the I/O request into a suitable SCSI command structure and forwards the SCSI commands to a SCSI host bus adapter (HBA). The SCSI HBA then forwards the commands to the specified SCSI target. Due to the intelligence of SCSI target devices, little intervention at this point is needed by the initiator to ensure completion of the I/O request. The target then completes the task as instructed.

In a host-based SCSI implementation, the host computer environment typically configures the SCSI host adapter as an initiator-type device, while the external components of the peripheral environment serve as target-type SCSI devices. For example, in a conventional computing environment, the SCSI initiator is provided in the form of a SCSI controller or SCSI host adapter resident on a host computer platform.

However, one persistent problem in SCSI-based systems involves the ability to seamlessly and readily integrate the multitude of peripheral devices into the host computer environment in a manner that avoids any compatibility problems. For example, due to the proliferation of peripheral devices from a vast number of OEMs (Original Equipment Manufacturers), system integrators typically face the problem of attempting to integrate external devices from a variety of vendors into the host computer environment. As a result, there typically is a behavioral variation between SCSI initiator and target operations that must be addressed before the system can be made fully functional.

The principal integration issue involves resolving the compatibility and interoperability problems concerning the relationship between the host-based SCSI initiator device and the external SCSI target device. In particular, it is necessary to ensure that the behavior of the various SCSI targets conforms to the operational expectations of the SCSI initiator. However, conventional strategies for suitably configuring the SCSI target are beset with difficulties because the approach usually involves piecemeal ad hoc solutions. For example, users typically need to interact repeatedly with both the SCSI initiator and target to facilitate the required configurations setup.

It is therefore seen that computer systems integrators must find appropriate solutions to readily configure SCSI target devices so as to ensure compatibility and interoperability with SCSI initiator devices. The ability of the SCSI initiator to access and intelligently communicate with any SCSI target device connected to the SCSI bus requires the target to exhibit a behavior compatible with the functioning of the SCSI initiator.

Typically, the target behavior requires adjustment, modification or other such alteration so as to place it in a condition that facilitates or enables access by the initiator. This behavior modification usually takes the form of reconfiguring the parameters that govern the behavioral aspects of the target. However, conventional approaches to such target reconfiguration lack uniformity and have proved unwieldy and cumbersome since the approach normally involves user intervention both at the host side and peripheral side.

For example, a user may need to interface with the peripheral device through a supplied control line if any such interaction is needed at the target side to manage aspects of the reconfiguration process. A user also may be required to manually alter various hardware-related settings in the target environment. This peripheral-side interaction also would be accompanied by user action taken at the host computer, such as executing a routine to pass command codes to the target.

SCSI commands are classified by the SCSI protocol as mandatory, optional, or vendor unique. However, in conventional schemes that do employ host-side command routines, attempts by the ordinary user to implement target reconfiguration typically do not employ vendor unique commands due to the level of expertise needed to understand and implement these commands. This limitation therefore affects the functionality and available number of operational configurations for the target.

What is therefore needed is a process that allows the host environment to fully configure the target device without any user intervention.

SUMMARY OF THE INVENTION

According to the present invention there is provided a method, apparatus, and computer program product for variously implementing a fully automatic reconfiguration feature capable of fully reconfiguring the behavior of a SCSI target device using a host system functionality. This functionality may employ suitable software, hardware, firmware, or any combination thereof. According to the invention, the validation process between the host (initiator) and target can be fully automated.

Generally, validation refers to the processes for verifying that a part or device works as expected. As used herein, according to one form of the invention, validation involves the use of suitable processes for determining that the peripheral SCSI devices connected to the host environment work in both the target and initiator mode. In particular, validation ensures compatibility and interoperability between the SCSI host adapter and SCSI peripheral device.

In one form, it may be considered that the validation routine is implemented with a communications layer between the host-based initiator and target that carries out the reconfiguration process.

For example, host-resident software may implement a validation procedure that employs a target command structure constructed from vendor specific or vendor unique command codes recognizable by the target. In particular, these vendor unique command codes are developed by the peripheral device manufacturer for purposes of controlling, setting, and otherwise managing the parameters and behavior of the device.

As understood herein, the automatic validation feature encompasses the capabilities and functionalities that enable the target device to be fully and completely reconfigured by execution of the command structure received from the initiator (i.e., SCSI host adapter), without any user intervention. As a result of this validation process, the target behavior is modified, altered, or otherwise adapted to the behavior of the SCSI host adapter or controller (i.e., initiator) to facilitate seamless interoperability. In one form, the validation process ensures that the peripheral SCSI device in the external environment can operate in both a target mode and an initiator mode.

For example, the command structure may be implemented in the form of a self-executing application client process resident on the initiator. This application client may be launched, for example, in response to a BIOS instruction issued from the host operating system or from a high-level utility or user application program resident within the host operating system environment.

Alternately, the SCSI host adapter or controller that encompasses the initiator-type functionality may include or have access to the reconfiguration command structure. Accordingly, a low-level process may be instituted by the initiator to effectuate the reconfiguration. For example, microcode embodying vendor-unique commands suitable to the target may be retrieved by the initiator and downloaded to the target for processing and execution.

Alternately, the reconfiguration process can be instituted by the SCSI initiator as part of an initialization process for the overall host computer system environment. Alternately, the SCSI initiator may institute or attempt reconfiguration each time an access request is made to the specified target. For this purpose, the initiator may first interrogate the target to determine if prior reconfiguration has taken place. If not, the initiator can proceed with the reconfiguration process.

In configurations where the SCSI host adapter assumes control of the reconfiguration process, the host adapter will preferably be equipped with suitable resident software and/or firmware designed to produce the behavioral modifications of the SCSI peripheral device.

In one illustrative form, the invention may be practiced as a client-server transaction such as a request for device service generated by the host-based initiator and directed to the peripheral target. For example, an application client residing within the initiator may invoke a procedure call to execute a SCSI command function directed to the target device. This request may take the form of a command such as the Execute Command remote procedure call. The initiator may alternately issue a task management function directed to the target.

The SCSI Execute Command includes a Command Descriptor Block (CDB) employing vendor specific commands recognizable by the target device. As known, the CDB will also include the appropriate command-specific parameters and other inputs needed by the target to implement and execute the commands.

In one exemplary form, the initiator directs automatic reconfiguration of the target using a SCSI WRITE BUFFER command to download vendor-specific microcode to a non-volatile memory space at the target. For example, the destination of such write command could be the target-resident configuration-type EPROM where configuration information is stored and referenced when needed by the target to effectuate a re-configuration. In particular, the microcode could be loaded into a target ROM space typically containing configuration files.

According to the invention, the command execution request directed from the initiator to the target fully defines the configuration process needed to modify the parameters/behavior of the target device in a manner sufficient to make it interoperable with the SCSI host adapter (i.e., initiator).

In another form, the command execution request that facilitates auto-configuration of the target is embodied as target driver software resident within the initiator.

The invention, in one form thereof, is directed to a method for use in combination with a SCSI target and a SCSI initiator. According to the method, a command construct is defined that includes vendor specific commands associated with the SCSI target. The command construct defines an automatic configuration process pertaining to the SCSI target. The SCSI initiator directs the command construct to the SCSI target. In response, the SCSI target processes the command construct to effect automatic configuration thereof in accordance with the command construct.

The automatic configuration process defined by the command construct facilitates behavioral modification of the SCSI target in a manner sufficient to conform SCSI target behavior to SCSI initiator behavior. For example, the automatic configuration process facilitates selective variation of SCSI target parameters and/or behavior.

In another form, it may be considered that the automatic configuration process facilitates automatic validation between the SCSI initiator and the SCSI target.

In another form, the command construct includes vendor specific microcode executable by the SCSI target. For this purpose, the command construct includes a SCSI write command facilitating the download of vendor specific microcode into a memory space of the SCSI target.

In yet another form, the command construct includes a Command Descriptor Block having vendor specific commands, command-specific parameter values, and/or input data.

The SCSI initiator is preferably configured as part of a host computer environment.

The method, in another form thereof, further involves invoking a process at the application layer in the host computer environment to direct the SCSI initiator to transport the command construct to the SCSI target.

The invention, in another form thereof, is directed to a system including, in combination, a SCSI bus, a SCSI target operatively connected to the SCSI bus, and a SCSI initiator operatively connected to the SCSI bus. The system further includes an executable code structure associated with the SCSI initiator. The executable code structure defines a target configuration process enabling automatic configuration of the SCSI target.

The SCSI target is operatively configured to receive and execute the code structure from the SCSI initiator to effect automatic configuration thereof.

The code structure, in one form thereof, defines parameters and/or behavior of the SCSI target. In another form, the code structure includes vendor specific commands associated with the SCSI target.

In another form, the code structure includes vendor specific microcode associated with and executable by the SCSI target. For this purpose, the SCSI target is configured to receive and store the vendor specific microcode from the SCSI initiator in a behavior configuration space.

The invention, in another form thereof, is directed to a computer program product for use in a host computer environment to facilitate communications between an initiator and a target. The host computer environment is configured with the initiator. The computer program product includes a computer usable medium having computer readable program code thereon. The computer readable program code includes, in combination, program code for defining a command construct suitable for use in automatically configuring the target, and program code for directing communication of the command construct to the target to cause automatic configuration of the target in accordance with the command construct.

In one form, the command construct includes vendor specific commands associated with and executable by the target.

In another form, the command construct includes vendor specific microcode loadable into and executable by the target.

The command construct preferably defines a target behavior sufficient to effectuate compatibility with initiator behavior. For example, the command construct may define a target configuration process enabling selective variation of target parameters and/or behavior.

One advantage of the invention is that the automatic target reconfiguration provides full compliance, conformity, and interoperability between the initiator behavior (i.e., SCSI host adapter) and target behavior.

Another advantage of the invention is that the host is equipped with an initiator-resident software driver routine that fully and automatically configures the target, thereby obviating any user intervention.

Another advantage of the invention is that any required modification to the target behavior can be made entirely under the direction and control of a command process issued by the host system environment.

Another advantage of the invention is that the command process for varying the behavior of the target employs vendor specific commands to enable the fullest possible range of target behavior modification.

Another advantage of the invention is that the auto-configuration feature can be used with standard target structures requiring no adaptations thereof since the initiator-resident command module employs vendor unique commands recognizable by the target.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
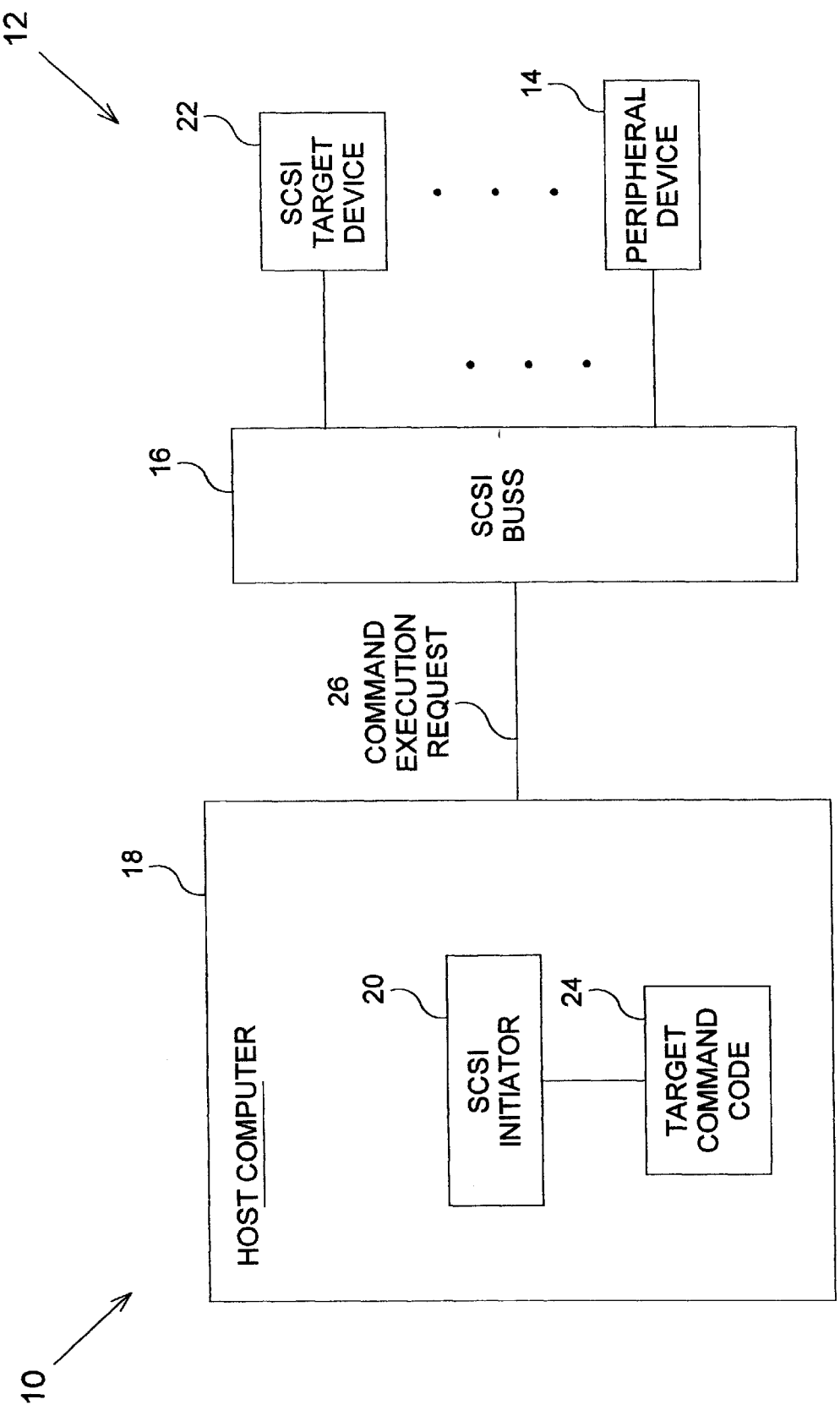
FIG. 1 is a schematic block diagram view of a SCSI system, according to one embodiment of the present invention.

Referring now to the drawings and particularly to FIG. 1, there is shown a simplified block diagram illustration of a system for use in performing a validation process involving a host computer environment and a SCSI peripheral environment (e.g., SCSI target device). More specifically, a communications layer is provided between a host-based SCSI device (e.g., configured as an initiator) and a peripheral SCSI device (e.g., configured as a target). The communications layer is used to facilitate automatic reconfiguration of the target.

In alternate forms, the automatic reconfiguration should be understood as encompassing any process by which the behavior of the SCSI target is modified, altered, adapted, or otherwise fashioned to conform to the behavior of the SCSI host adapter or controller, which preferably has an initiator functionality. This behavioral conformity ensures that the SCSI peripheral device is compatible with the SCSI host adapter for both target mode and initiator mode functionality. In this manner, the SCSI host adapter and SCSI target device can seamlessly interoperate.

Referring specifically to FIG. 1, there is shown a host computer environment 10 configured in a conventional manner with peripheral environment 12. As known, peripheral environment 12 may define an external device environment including various peripheral devices 14. The host environment 10 (Ahost 10") and peripheral environment 12 (Aperipheral 12") preferably are configured in a SCSI environment. Accordingly, a conventional SCSI bus 16 may be used to interconnect host 10 and peripheral 12.

For purposes of facilitating a SCSI implementation, the illustrated host 10 includes a conventional host computer platform 18 having a resident SCSI device 20 preferably configured as an initiator. As known to those skilled in the art, SCSI initiator devices issue operation requests that are performed by SCSI devices configured as targets. SCSI devices can be configured with both an initiator and target functionality.

In one configuration, SCSI initiator 20 may be incorporated into a SCSI host bus adapter (HBA) or SCSI controller integrated into host computer 18. However, it should be apparent that any suitable means may be used to implement a SCSI initiator in host computer 18.

The system architecture shown in FIG. 1 is provided for illustrative purposes only and should not be considered in limitation of the present invention. Rather, it should be apparent that the present invention may be practiced in connection with any SCSI environment.

As illustrated in FIG. 1, SCSI initiator 20 may direct commands and/or operation requests via SCSI bus 16 to a peripheral component such as representative SCSI target device 22. As indicated previously, conformance issues arise due to the potential incompatibility between the respective behaviors of host computer 18 (i.e., initiator 20) and target 22. It is an object of the present invention to provide a mechanism for rendering the potentially disparate behaviors compatible with one another and thereby provide SCSI host-target validation.

Referring again to FIG. 1, host computer 18 is provided with target command code 24 associated with SCSI initiator 20. Command code 24 defines a reconfiguration or behavioral modification process for SCSI target 22. In particular, command code 24 includes a command structure that is executable by target 22 in a manner sufficient to automatically configure SCSI target 22 so that its behavior is made compatible and/or interoperable with host computer 18 (i.e., initiator 20).

Preferably, this compatibility concerns both a target mode and an initiator mode functionality for SCSI device 22. More particularly, the host-resident reconfiguration process is able to render SCSI device 22 compatible with host computer 18 in connection with both target and initiator modes of SCSI device 22.

In one form, command code 24 includes vendor-specific or vendor-unique commands that are recognizable and therefore executable by target 22. As known, the SCSI command protocol for constructing the command module (i.e., Command Descriptor Block (CDB)) provides various fields for inserting vendor specific information.

In particular, the format of a SCSI CDB generally includes an operation code, command-specific parameters, and control. The operation code includes a group code field and command code field. Group codes 6 and 7 are reserved for vendor specific commands. The command code field, for example, would contain the specific vendor-unique command codes. The control field of the SCSI CDB format also supports vendor specific sections.

In view of the above, and in accordance with the present invention, the illustrated target command code 24 would be constructed with the appropriate vendor-unique command codes to facilitate automatic configuration of SCSI target device 22 upon execution of the command codes by SCSI target device 22. This command code construction may take place in various suitable forms.

For example, the relevant command code can be formulated in association with SCSI initiator 20 by preparing a suitable Command Descriptor Block with the pertinent vendor-unique command codes. The CDB would also include the desired settings and values for the command-specific parameters. Alternately, the CDB or other suitable communication format may be used to transport to the target a preexisting, ready-made microcode module containing all of the relevant commands and parameter definitions.

The following discussion provides examples of various illustrative vendor unique commands for use in practicing the present invention. It should be understood that these commands are provided for illustrative purposes only and should not be considered in limitation of the present invention, as other suitable commands may be used. Each command is accompanied by a corresponding command format description.

Vendor Unique Commands (1) read_byte_recovery, write_byte_recovery:

| 0xe0 (read), 0xe1 (write) |
|---|
| byte count-MSB |
| byte count-LSB |

When one of these commands is received, the amount of data specified in the CDB is transferred, followed by an unexpected disconnect. No attempt is ever made to reselect the initiator for this command.

(2) read_phase_mismatch, write_phase_mismatch:

| 0xe2 (read), 0xe3 (write) |
|---|
| byte count |

When one of these commands is received, the amount of data specified in the CDB is transferred, then a Save Pointers/Disconnect message sequence is sent, then the target disconnects. No attempt is ever made to reselect the initiator for this command.

(3) phase_to_phase:

| 0xe4 |
|---|
| phase 1 |
| byte count |
| phase 2 |

When this command is received, the target moves Abyte count@ number of bytes in Aphase 1@ phase, then changes phase to Aphase 2@ and transfers Abyte count@ number of bytes again.

Subsequently, the target goes to status and message phases and completes the command as normal.

(4) read_special_disconnect, write_special_disconnect:

| |
|---|
| 0xe5 (read), 0xe6 (write) |
| byte count-MSB |
| byte count-LSB |
| bytes per connection |

These commands are treated as if they were regular read and write commands. The only difference is that the Abytes per connection@ field is used to determine where to disconnect instead of the drive cache size. If the Abytes per connection@ is odd, no special handling is done in the read case, and thus the total number of bytes sent will not match the Abyte count@ given in the CDB unless the initiator makes the proper adjustments at each disconnect. In the write case, if the Abytes per connection@ value is odd, the value is incremented to make it even.

(5) read_one_disconnect, write_one_disconnect:

| |
|---|
| 0xe7 (read), 0xe8 (write) |
| byte count-MSB |
| byte count-LSB |
| bytes transferred before |
| first disconnect |

These commands are handled similarly to the read_special_disconnect and write_special_disconnect commands. The only difference is that these commands will disconnect only once during the transfer, after Abytes transferred before first disconnect@ bytes. After this the target will reconnect and transfer the remaining portion of the data. The case where Abytes transferred before first disconnect@ is odd is handled in exactly the same way.

(6) write_special_block:

| |
|---|
| 0xe9 |
| data pattern |

This command tells the target to receive one logical block and compare that block to the pattern defined in Adata pattern.@ The Adata pattern@ is defined as follows:

0x00: data is all zeros;
0x01: data is all 0xff;
0x02: data is an incrementing pattern starting at 0x00.

On data miscompare, a check condition will be sent and the sense data available will be as follows:

Sense Key: 0x0e;
ASC: 0x1d;
ASCQ: 0x00.

(7) iwr_special_disconnect:

| |
|---|
| 0xea |
| byte count-MSB |
| byte count-LSB |
| bytes per connection |

The only difference between this command and the read_special_disconnect command is that if the system is running in wide SCSI mode, and the Abytes per connection@ value is odd, an Ignore Wide Residue message will be sent in conjunction with the Save Pointers/Disconnect message sequence.

(8) iwr_one_disconnect:

| |
|---|
| 0xeb |
| byte count-MSB |
| byte count-LSB |
| bytes transferred before |
| first disconnect |

The only difference between this command and the read_one_disconnect command is that if the system is running in wide SCSI mode, and the Abytes transferred before first disconnect@ value is odd, an Ignore Wide Residue message will be sent in conjunction with the Save Pointers/Disconnect message sequence.

(9) iwr_random_disconnect:

| |
|---|
| 0xec |
| byte count-MSB |
| byte count-LSB |

This command works similarly to the iwr_special_disconnect command. The only difference is that this command disconnects at random places within the total block. If the random number of bytes to be transferred before each disconnect is odd, and the system is running in wide SCSI mode, then an Ignore Wide Residue message will be sent in conjunction with the Save Pointers/Disconnect message sequence.

(10) read_parity_error, write_parity_error:

| |
|---|
| 0xed (read), 0xee (write) |
| bytes before error MSB |
| bytes before error LSB |
| number of bad bytes |
| bytes after error MSB |
| bytes after error LSB |

In the Read case, this command tells the target to move the byte count specified in command bytes 1 and 2. Then the target sets the assert even SCSI parity bit and sends the number of bytes in command byte 3. After that, the even SCSI parity bit is cleared and the final set of bytes (in commands bytes 4 and 5) are sent.

In the Write case, the target is set up to take the entire amount of data in one block move command. When the total amount of data is received, and if a parity error was detected, then the target will return good status. Otherwise, the target will return a check condition. However, there will be no related sense data.

(11) set_crc_interval:

| |
|---|
| 0xef |
| Interval |

The interval given in the second byte of this command is placed into the CRC interval timer. If a value of zero is given, then the CRC interval timer is disabled. Illegal values cause a check condition to be returned; however, no sense data will be set up.

(12) read_random_crc_interval, write_random_crc_interval:

| 0xf0 (read), 0xf1 (write) |
| --- |
| block count |

This command moves the specified number of logical blocks, inserting CRC requests at random intervals throughout the code. Disconnects are allowed when using this command.

(13) read_bad_crc, write_bad_crc:

| 0xf2 (read), 0xf3 (write) |
| --- |
| good blocks |
| blocks before reseeding |
| bad blocks |

This command works similarly to the parity error commands. In the Read case, the Agood blocks@ data is moved, followed by the number of blocks requested before reseeding. At this point, the CRC setup is reseeded. Then the last data is sent.

In the Write case, the target moves the total amount of data specified in the entire command. At the end of this transfer, a CRC request is made. If a CRC error is reported, then the target returns good status. If not, then a check condition is sent to the initiator, with no related sense data.

(14) read_start_with_crc, write_start_with_crc:

| 0xf4 (read), 0xf5 (write) |
| --- |
| LBA MSB (lower 5 bits) |
| LBA |
| LBA LSB |
| Block Count |
| 0x00 |

These commands work exactly the same as six byte read and write commands, except that the transfer starts with a CRC request before any data has been moved. Both commands ignore the disconnect bit in the identify message.

(15) read_walk_crc_interval, write_walk_crc_interval:

| 0xf6 (read), 0xf7 (write) |
| --- |
| block count |
| beginning interval |
| interval increment |

This command moves the specified number of logical blocks, and inserts CRC requests every beginning interval+ interval increment. For example, if the beginning interval is set at 4, and the interval increment is set at 2, then CRC requests will be sent at 4 bytes, 6 bytes, 8 bytes, etc. If interval increment is zero, then the same interval will be used throughout the transfer. Both intervals must be even numbers.

Vendor unique commands may also be used to purposely inject errors into the target environment to determine and/or evaluate target response. Moreover, other vendor unique commands may be used to control SCSI disconnects and PCI (Peripheral Component Interconnect) interfacing.

The reconfiguration process disclosed herein may also be used to establish compatible communications and data transfer protocols employing interfaces other than SCSI, such as Fiber Channel and Serial ATA. For this purpose, suitable vendor unique commands would be chosen to facilitate the proper reconfiguration in a manner similar to that discussed herein in connection with a SCSI environment.

Figure 2:
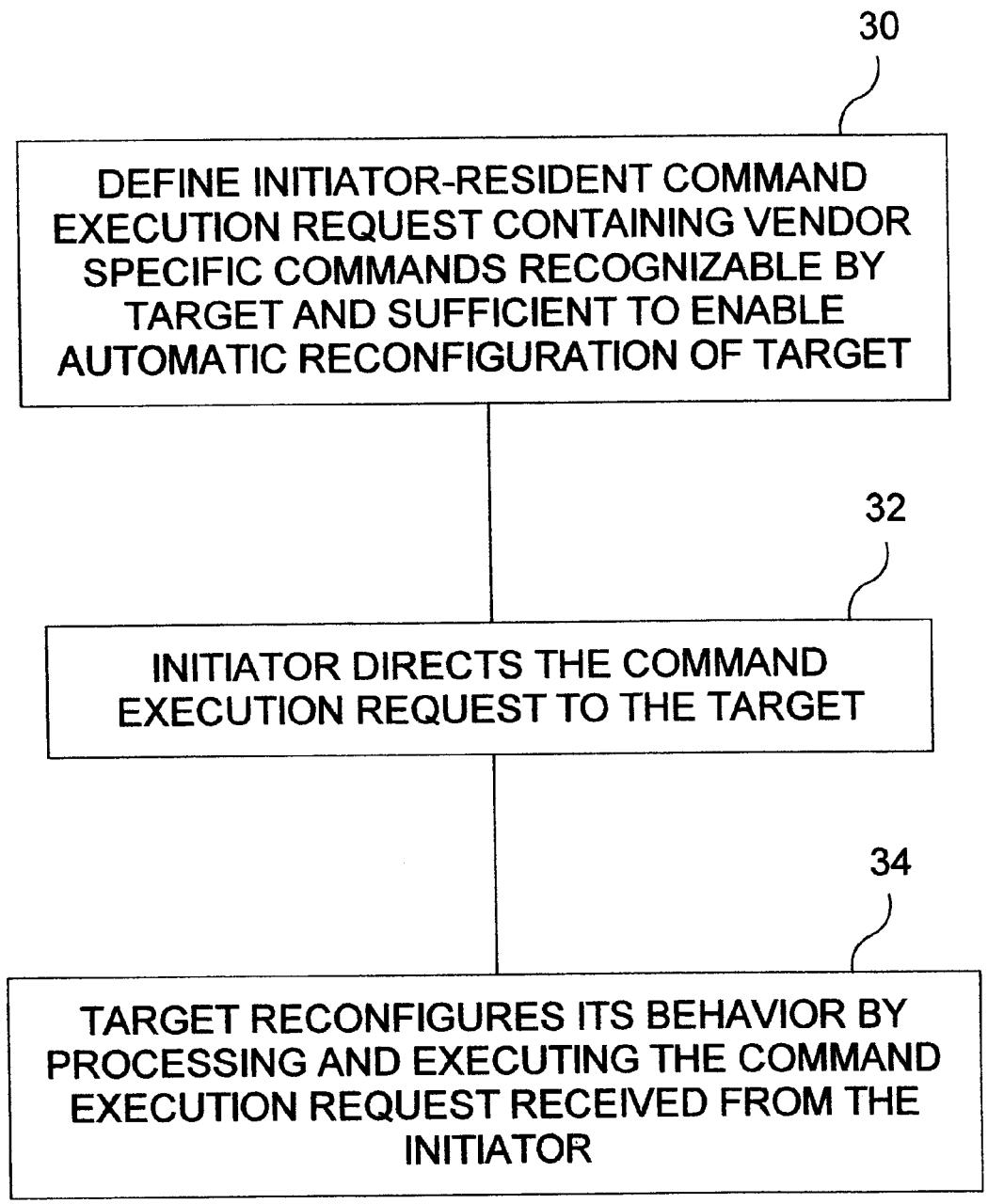
FIG. 2 is a flowchart depicting one illustrative operating sequence for implementing the SCSI target reconfiguration process, according to another embodiment of the present invention.

Reference is now made to FIG. 2 showing a flowchart detailing one illustrative operating sequence for reconfiguring target 22.

A suitable target command code 24 is provided that defines a reconfiguration process for target 22. Initiator 20 embodies this command code 24 within a command execution request 26 directed to target device 22. (Step 30). In known manner, initiator 20 causes request 26 to be transported to target 22 for performance of the requested operation. (Step 32). In this implementation, the underlying operation involves directing target 22 to reconfigure itself in response to and in accordance with the set of vendor-unique command codes contained within request 26.

In a preferred form, command code 24 will be provided in conjunction with a host application resident on host computer environment 18. In this manner, a high-level user program (e.g., an application layer software component) may be used to invoke the reconfiguration process. For example, a user interactive program may be used to launch command code 24. For this purpose, well known software techniques and operating system configurations may be used to functionally link the user program at the host application layer with command code 24. It is of course apparent that command code 24 will use the functionality of SCSI initiator 20 to enable host computer 18 to communicate with and transport commands to SCSI target 22.

In an alternate form, command code 24 may be embodied within the SCSI host adapter (i.e., initiator 20). For this purpose, initiator 20 will be configured with the suitable software and/or firmware to launch the reconfiguration process embodied within command code 24.

Accordingly, it can be seen that the behavior of SCSI target 22 may be modified by a high-level, host-based functionality resident at the host computer 18 (e.g., an application layer module in the computer OS environment) and/or a relatively low-level functionality resident within the SCSI host adapter (i.e., SCSI initiator 20).

Referring again to FIG. 2, at the target environment side, target 22 receives request 26, interprets the command instructions contained therein, and performs the reconfiguration process dictated by the individual vendor-unique commands. (Step 34). Execution of the vendor-unique commands is specifically directed at varying certain specified ones of the target parameters. This parameter variation effectively alters the behavior of SCSI target 22.

When the request 26 embodies a prepackaged vendor-specific microcode routine, target 22 may load this microcode into its ROM-type configuration file space. Thus, when reconfiguration is required, the microcode is referenced by the intelligent controller of target 22 and thereafter executed.

It is seen that request 26 embodies all of the information necessary to selectively configure target 22. In particular, request 26 will include a complete set of vendor-specific commands and command-specific parameter settings to provide a fully self-contained execution module. Notably, because target command code 24 employs vendor-unique commands to develop the reconfiguration control instructions, target 22 need not consult or otherwise communicate with host 18 (i.e., initiator 20) to execute the commands or to obtain additional information or clarification. Target 22 has the capability to fully interpret and implement the command instructions without further interaction with initiator 20, other than the normal SCSI communications involving notification of completion of the request.

Figure 3:
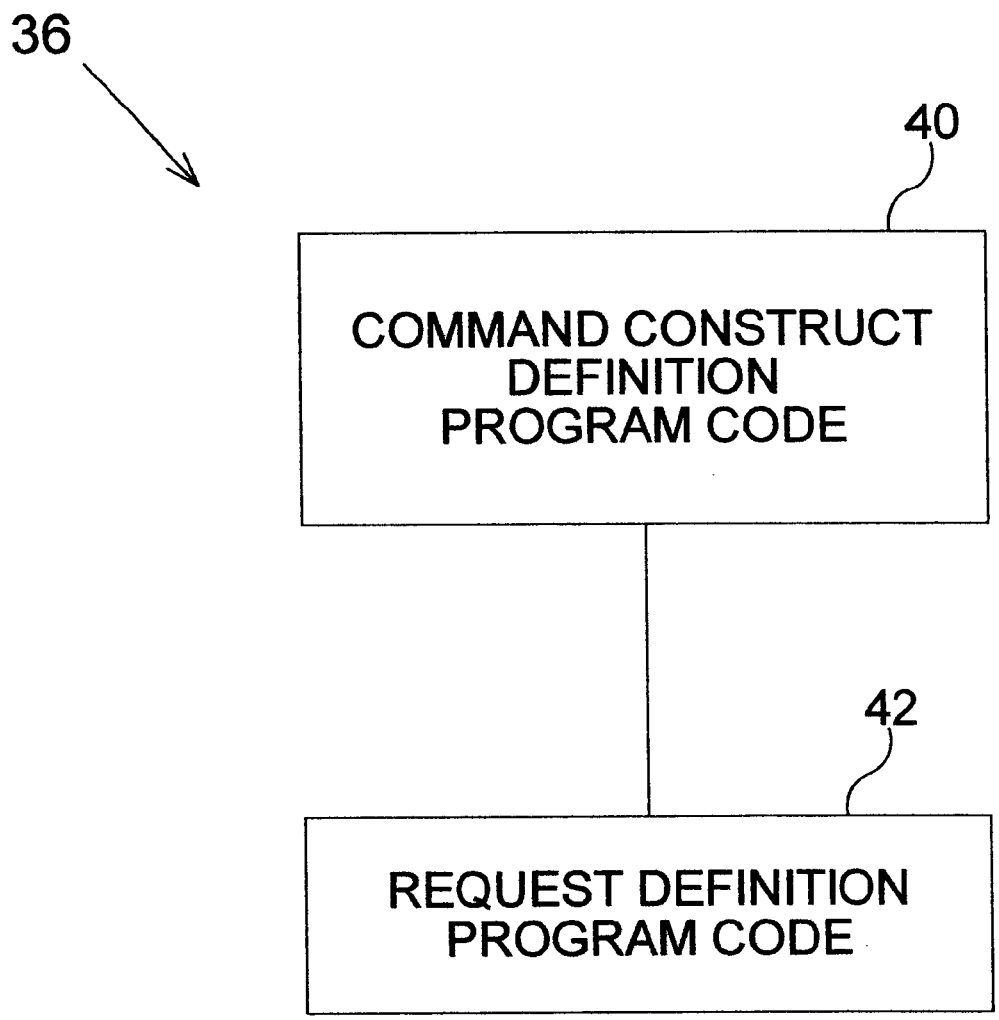
FIG. 3 is a block diagram modular view of a host-based software process for implementing SCSI target reconfiguration, according to another embodiment of the present invention.

Reference is now made to FIG. 3, which illustrates in modular form the individual functional units of a software-based program code implementation of the present invention. Specifically, the program code embodies the target reconfiguration process or behavioral modification process discussed above in relation to FIGS. 1 and 2.

The illustrated software product 36 includes in representative form a command construct definition program code module 40 and a request definition program code module 42. Product 36, for example, would be embodied within or otherwise associated with initiator 20.

The illustrated module 40 provides the software process and functionality for constructing the executable command structure that will be transported to the SCSI target, i.e., target command code 24. Module 40, in particular, will utilize the vendor-specific commands and related command-specific parameters to develop the required command structure.

The illustrated module 42 will generate an operation request directed to target 22 (i.e., command execution request 26) that embodies the as-completed command construct definition furnished by module 40. The generated request is transported to target 22 according to well known SCSI transport methods.

The following reference documents provide supplemental information regarding SCSI specifications, specifically the design of target drivers and host bus adapter drivers: ASmall Computer System Interface (SCSI) Standard,@ ANSI X3.131-1986, available from American National Standards Institute, 1430 Broadway, New York, N.Y. 10018; ASmall Computer System Interface 2 (SCSI-2) Standard,@ document X3.131-1994, available from Global Engineering Documents, 15 Inverness Way, East Englewood, Colo. 80112-5704; ABasics of SCSI@, available from ANCOT Corporation, Menlo Park, Calif. 94025; and ASCSI Bench Reference@ available from Endl Publications. Each of these documents are incorporated herein by reference thereto.

Moreover, it should be apparent to those skilled in the art that details on the SCSI command specification for any target device may be readily available from the hardware vendor. In particular, construction of the command structure that is transported from the SCSI initiator to SCSI target for purposes of automatically configuring the target will preferably reference such a SCSI command specification for information on the vendor-unique and/or vendor-specific commands. For example, the proper coding of the vendor-unique fields of the Command Descriptor Block will reference such a vendor command specification. One skilled in the art readily possesses the facility to reference the specification documents and build a suitable target command code according to the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for use in combination with a SCSI target and a SCSI initiator, said method comprising the steps of:
    defining a command construct including vendor specific commands associated with the SCSI target, the command construct defining an automatic configuration process pertaining to the SCSI target;
    the SCSI initiator directing the command construct to the SCSI target; and
    the SCSI target processing the command construct to effect automatic configuration thereof in accordance with the command construct.

2. The method as recited in claim 1, wherein the automatic configuration process defined by the command construct facilitates behavioral modification of the SCSI target in a manner sufficient to conform SCSI target behavior to SCSI initiator behavior.

3. The method as recited in claim 1, wherein the automatic configuration process defined by the command construct facilitates selective variation of SCSI target parameters and/or behavior.

4. The method as recited in claim 1, wherein the automatic configuration process defined by the command construct facilitates automatic validation between the SCSI initiator and the SCSI target.

5. The method as recited in claim 1, wherein the command construct including vendor specific microcode executable by the SCSI target.

6. The method as recited in claim 1, wherein the command construct includes a SCSI write command facilitating the download of vendor specific microcode into a memory space of the SCSI target.

7. The method as recited in claim 1, wherein the command construct includes a Command Descriptor Block having vendor specific commands, command-specific parameter values, and/or input data.

8. The method as recited in claim 1, wherein the SCSI initiator being configured as part of a host computer environment.

9. The method as recited in claim 8, further comprises the step of:
    invoking a process at the application layer in the host computer environment to direct the SCSI initiator to transport the command construct to the SCSI target.

10. A system, comprising:
    a SCSI bus;
    a SCSI target operatively connected to said SCSI bus;
    a SCSI initiator operatively connected to said SCSI bus; and
    an executable code structure associated with said SCSI initiator, the executable code structure defining a target configuration process enabling automatic configuration of said SCSI target.

11. The system as recited in claim 10, wherein said SCSI target being operatively configured to receive and execute the code structure from said SCSI initiator to effect automatic configuration thereof.

12. The system as recited in claim 10, wherein said code structure defines parameters and/or behavior of said SCSI target.

13. The system as recited in claim 10, wherein said code structure including vendor specific commands associated with said SCSI target.

14. The system as recited in claim 10, wherein said code structure includes vendor specific microcode associated with and executable by said SCSI target.

15. The system as recited in claim 14, wherein said SCSI target being configured to receive and store the vendor specific microcode from said SCSI initiator in a behavior configuration space.

16. A computer program product for use in a host computer environment to facilitate communications between an initiator and a target, the host computer environment being configured with the initiator, the computer program product comprising a computer usable medium having computer readable program code thereon, the computer readable program code comprising:

program code for defining a command construct suitable for use in automatically configuring said target; and program code for directing communication of the command construct to said target to cause automatic configuration of said target in accordance with the command construct.

17. The computer program product as recited in claim 16, wherein the command construct includes vendor specific commands associated with and executable by said target.

18. The computer program product as recited in claim 16, wherein the command construct includes vendor specific microcode loadable into and executable by said target.

19. The computer program product as recited in claim 16, wherein the command construct defining a target behavior sufficient to effectuate compatibility with initiator behavior.

20. The computer program product as recited in claim 16, wherein the command construct defining a target configuration process enabling selective variation of target parameters and/or behavior.

* * * * *

UNITED STATES PATENT AND TRADEMARK OFFICE
CERTIFICATE OF CORRECTION

PATENT NO.    : 6,601,119 B1
DATED         : July 29, 2003
INVENTOR(S)   : Mark A. Slutz et al.

It is certified that error appears in the above-identified patent and that said Letters Patent is hereby corrected as shown below:

<u>Title page,</u>
Item [75], Inventor, add:
-- David S. So, Colorado Springs, CO (US) --

Signed and Sealed this

Sixteenth Day of December, 2003

JAMES E. ROGAN
*Director of the United States Patent and Trademark Office*